(12) United States Patent
Yamashita et al.

(10) Patent No.: US 12,036,901 B2
(45) Date of Patent: Jul. 16, 2024

(54) RECLINING DEVICE AND SEAT

(71) Applicant: DELTA KOGYO CO., LTD., Hiroshima (JP)

(72) Inventors: Mitsuhiro Yamashita, Hiroshima (JP); Takuto Shimasaki, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 121 days.

(21) Appl. No.: 17/997,100

(22) PCT Filed: Jan. 31, 2022

(86) PCT No.: PCT/JP2022/003499
§ 371 (c)(1),
(2) Date: Oct. 25, 2022

(87) PCT Pub. No.: WO2022/181214
PCT Pub. Date: Sep. 1, 2022

(65) Prior Publication Data
US 2023/0264610 A1    Aug. 24, 2023

(30) Foreign Application Priority Data

Feb. 25, 2021 (JP) ................. 2021-028832

(51) Int. Cl.
*B60N 2/20* (2006.01)
*B60N 2/235* (2006.01)

(52) U.S. Cl.
CPC .............. *B60N 2/236* (2015.04); *B60N 2/235* (2013.01); *B60N 2/2356* (2013.01); *B60N 2205/50* (2013.01)

(58) Field of Classification Search
CPC ...... B60N 2/236; B60N 2/2356; B60N 2/235; B60N 2/2352
See application file for complete search history.

(56) References Cited

U.S. PATENT DOCUMENTS

| 4,611,853 A * | 9/1986 | Lehmann | B60N 2/20 |
| | | | 297/367 R |
| 8,038,218 B2 * | 10/2011 | Wahls | B60N 2/236 |
| | | | 297/367 R |

(Continued)

FOREIGN PATENT DOCUMENTS

| JP | 2004-113442 A | 4/2004 |
| JP | 3972648 B2 | 9/2007 |

(Continued)

OTHER PUBLICATIONS

International Search Report issued in PCT/JP2022/003499; mailed Apr. 5, 2022.

(Continued)

*Primary Examiner* — Syed A Islam
(74) *Attorney, Agent, or Firm* — Studebaker & Brackett PC

(57) ABSTRACT

Provided is a reclining device that achieves effective prevention of abnormal sound while permitting a clearance to exist between a cam and a connecting rod. A reclining device includes: a pair of reclining mechanisms each having an internal gear and a cam; a connecting rod coaxially coupled to the cam and being rotatable together with the cam; and a resin bush having a fit hole to receive a fitting part at a portion adjacent to each end of the connecting rod. The resin bush is placed in a bush insertion hole in contact with an inner surface of the bush insertion hole of the internal gear to retain the connecting rod at such a position to the cam that a clearance exists between an inner surface of a rod insertion hole of the cam and an outer surface of the connecting rod.

20 Claims, 15 Drawing Sheets

(56) References Cited

U.S. PATENT DOCUMENTS

| | | | | |
|---|---|---|---|---|
| 9,616,780 B2* | 4/2017 | Gallienne | ............. | B60N 2/236 |
| 9,701,222 B2* | 7/2017 | Kitou | ..................... | B60N 2/236 |
| 9,878,641 B2* | 1/2018 | Gallienne | ............ | B60N 2/2356 |
| 11,192,473 B2* | 12/2021 | Schmitz | ................. | B60N 2/236 |
| 11,772,527 B2* | 10/2023 | Teraguchi | ............. | B60N 2/235 |
| | | | | 297/366 |
| 2008/0073961 A1 | 3/2008 | Wahls et al. | | |
| 2020/0062150 A1* | 2/2020 | Ham | ..................... | B60N 2/433 |

FOREIGN PATENT DOCUMENTS

| | | |
|---|---|---|
| JP | 2014-217662 A | 11/2014 |
| WO | 2008/130075 A1 | 10/2008 |

OTHER PUBLICATIONS

The extended European search report issued by the European Patent Office on Oct. 9, 2023, which corresponds to European Patent Application No. 22759255.7-1012 and is related to U.S. Appl. No. 17/997,100.

\* cited by examiner

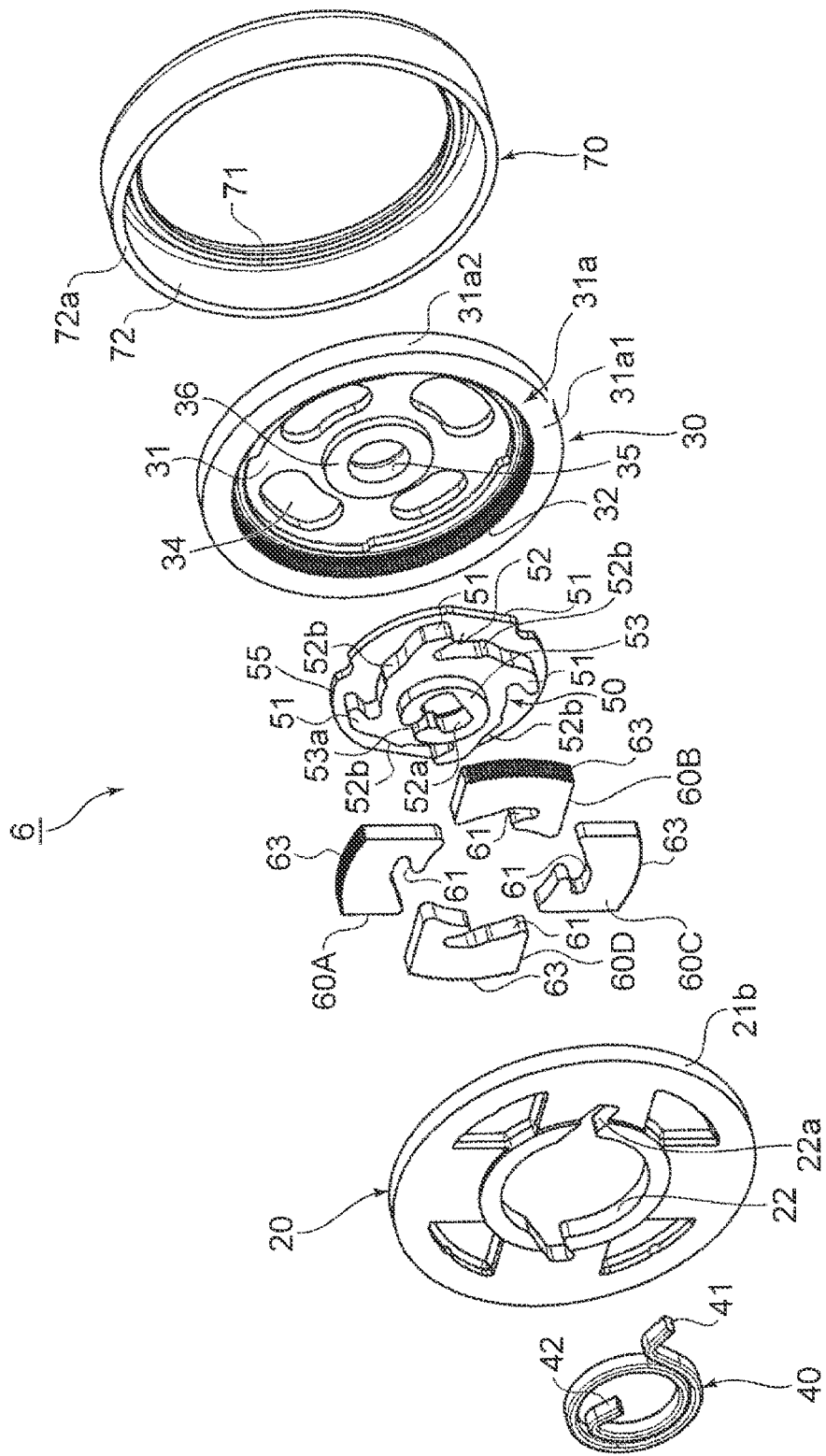

RECLINING DEVICE AND SEAT

TECHNICAL FIELD

The present invention relates to a reclining device, and a seat including the reclining device.

BACKGROUND ART

Conventional seats for vehicles involve a seat which includes a reclining device for fixing a seatback or backrest at a certain tilt angle in such a manner that the seatback is tiltable to a seat cushion or seat base in a front-rear direction.

The reclining device includes a pair of reclining mechanisms or recliners arranged on both sides of the seat in a width direction of the seat, and a connecting rod extending in the width direction of the seat and coupled to the reclining mechanisms.

Each of the reclining mechanisms has a cam coaxially coupled to each of the opposite ends of the connecting rod and being rotatable together with the connecting rod. When the connecting rod receives a rotational manipulation force from the outside of the seat, the cam rotates together with the connecting rod in a predetermined direction to disconnect a locking plate arranged in the periphery of the cam from an internal gear, thereby achieving lock release.

The structure where each end of the connecting rod is coaxially coupled to the cam, as described above, requires a clearance between an inner surface of a through hole of the cam and an outer surface of the connecting rod. Specifically, a dimensional difference and distortion of a frame assembly (i.e., an assembly including: frames of the seatback and the seat cushions; and the reclining mechanisms attached to the frames) that are attributed to deviation and twisting in setting up the frame assembly may give unfavorable influence on operability of the reclining mechanisms and a lock load. It is necessary to provide the clearance to accommodate the unfavorable influence.

The conventional reclining device requiring the clearance between the cam and the connecting rod has drawbacks that the cam and the connecting rod interfere with each other due to bouncing or swaying of a vehicle body, or an impact from the outside, resulting in making an abnormal sound (hitting sound).

In this regard, the reclining device disclosed in Patent Literature 1 has a thin elastic ring interposed between the cam and the connecting rod to prevent an occurrence of an abnormal sound while permitting a clearance to exist between the cam and the connecting rod. In this manner, abnormal sound suppression is aimed.

However, in the structure having the thin elastic ring interposed between the cam and the connecting rod as described in Patent Literature 1, the thin elastic ring determines relative positions of the cam and the connecting rod. For this reason, it is difficult to achieve effective prevention of abnormal sound while permitting the clearance to exist between the cam and the connecting rod. The reasons will be described below.

First, the elastic ring has a dimension restricted by a width of the clearance between the cam and the connecting rod. This makes it structurally difficult to increase the stiffness of the elastic ring by increasing the thickness of the elastic ring. Increasing the stiffness of the elastic ring for the prevention of abnormal sound under the dimensional restriction of the elastic ring leads to difficulty in inserting the elastic ring into the clearance between the cam and the connecting rod. This results in affecting the assembly of the reclining device. On the other hand, decreasing the stiffness of the elastic ring causes reduction in a holding force of the connecting rod, and thus an abnormal sound occurs even when the connecting rod only slightly shifts and comes into contact with the cam. From these perspectives, it is difficult to achieve effective prevention of abnormal sound while permitting the clearance to exist.

CITATION LIST

Patent Literature

Patent Literature 1: Japanese Patent Publication Number 3972648

SUMMARY OF INVENTION

The present invention has been achieved in view of the circumstances described above, and has an object of providing a reclining device that achieves effective prevention of abnormal sound while permitting a clearance to exist between a cam and a connecting rod.

Means for Solving the Problem

A reclining device according to the present invention is a reclining device for holding a seatback to a seat cushion in a tiltable manner and fixing the seatback at a certain tilt angle. The reclining device includes: a pair of reclining mechanisms arranged on both sides of a seat in a width direction thereof, and each having an internal gear fixedly attached to a frame of one of the seat cushion and the seatback and a cam arranged in juxtaposition with the internal gear in a thickness direction of the internal gear, a connecting rod extending in the width direction of the seat, coaxially coupled to the cam of each of the reclining mechanisms, and being rotatable together with the cam; and a resin bush having a cylindrical shape formed with a fit hole to receive a fitting part formed on the connecting rod at a portion adjacent to each end of the connecting rod. The cam has a rod insertion hole for allowing the end of the connecting rod to be inserted therein. The internal gear has a bush insertion hole for allowing the resin bush to be inserted therein at a center position of the internal gear. The fitting part adjacent to the end of the connecting rod fits in the fit hole of the resin bush, and the end of the connecting rod protrudes outward of the resin bush. The resin bush is placed in the bush insertion hole in contact with an inner surface of the bush insertion hole of the internal gear to retain the connecting rod at such a position to the cam that a clearance exists between an inner surface of the rod insertion hole of the cam and an outer surface of the connecting rod. The inner surface of the bush insertion hole has an edge of the bush insertion hole.

BRIEF DESCRIPTION OF DRAWINGS

FIG. 9 is an exploded perspective view of the reclining mechanism shown in FIG. 3.

DESCRIPTION OF EMBODIMENTS

Hereinafter, a preferable embodiment of the present invention will be described with reference to the accompanying drawings.

Figure 1:
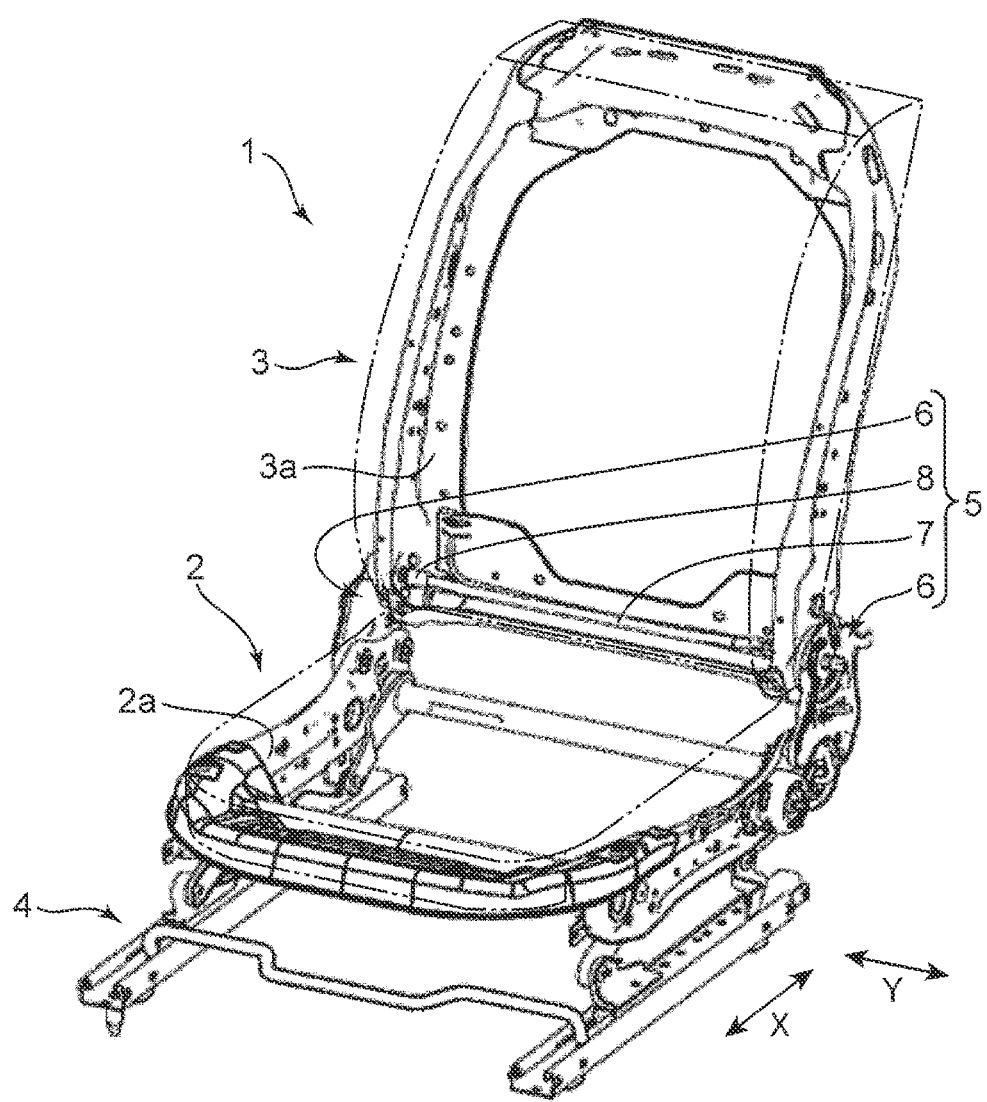
FIG. 1 is a perspective view showing an overall configuration of a seat including a reclining device according to an embodiment of the present invention.

As shown in FIG. 1, a seat 1 according to the embodiment is a vehicle seat, and includes: a seat cushion 2 for supporting buttocks of a seated person; a seatback 3 arranged in the rear of the seat cushion 2 to support the back of the seated person and being tiltable to the seat cushion 2 in a front-rear direction X of the seat 1; a sliding device 4 attached to a lower portion of the seat cushion 2; and a reclining device 5.

The sliding device 4 is configured to guide the seat cushion 2 slidably in the front-rear direction X of the seat 1, and fixedly hold the seat cushion 2 at a certain position. Here, the seat according to the present invention may not indispensably include the sliding device 4.

The reclining device 5 is configured to fixedly hold the seatback 3 at a certain tilt angle.

Figure 2:
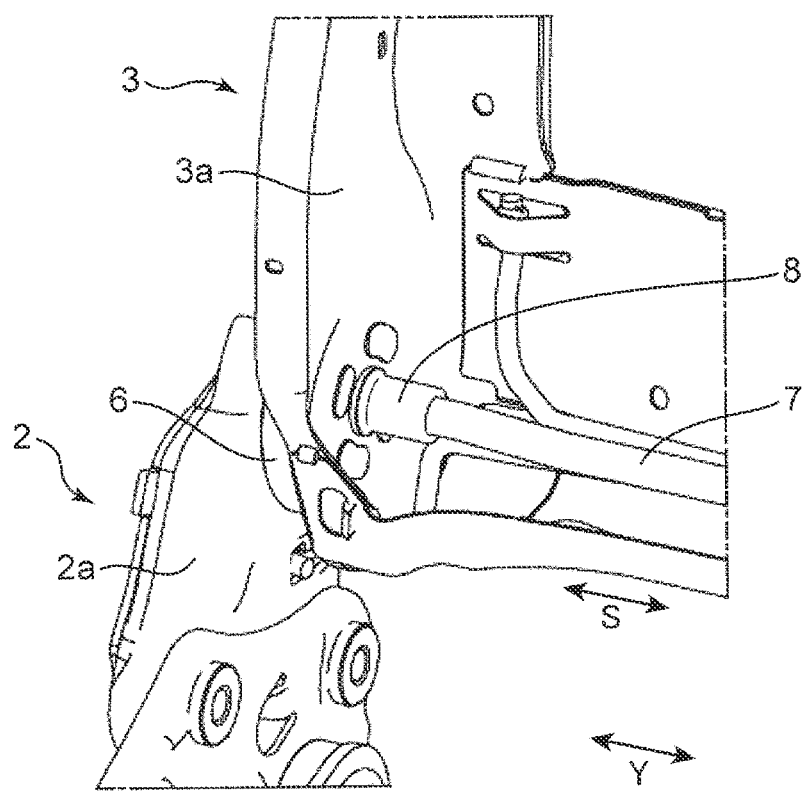
FIG. 2 is an enlarged perspective view showing arrangement of a resin bush and the reclining mechanism which are adjacent to each end of the connecting rod as shown in FIG. 1.
Figure 3:
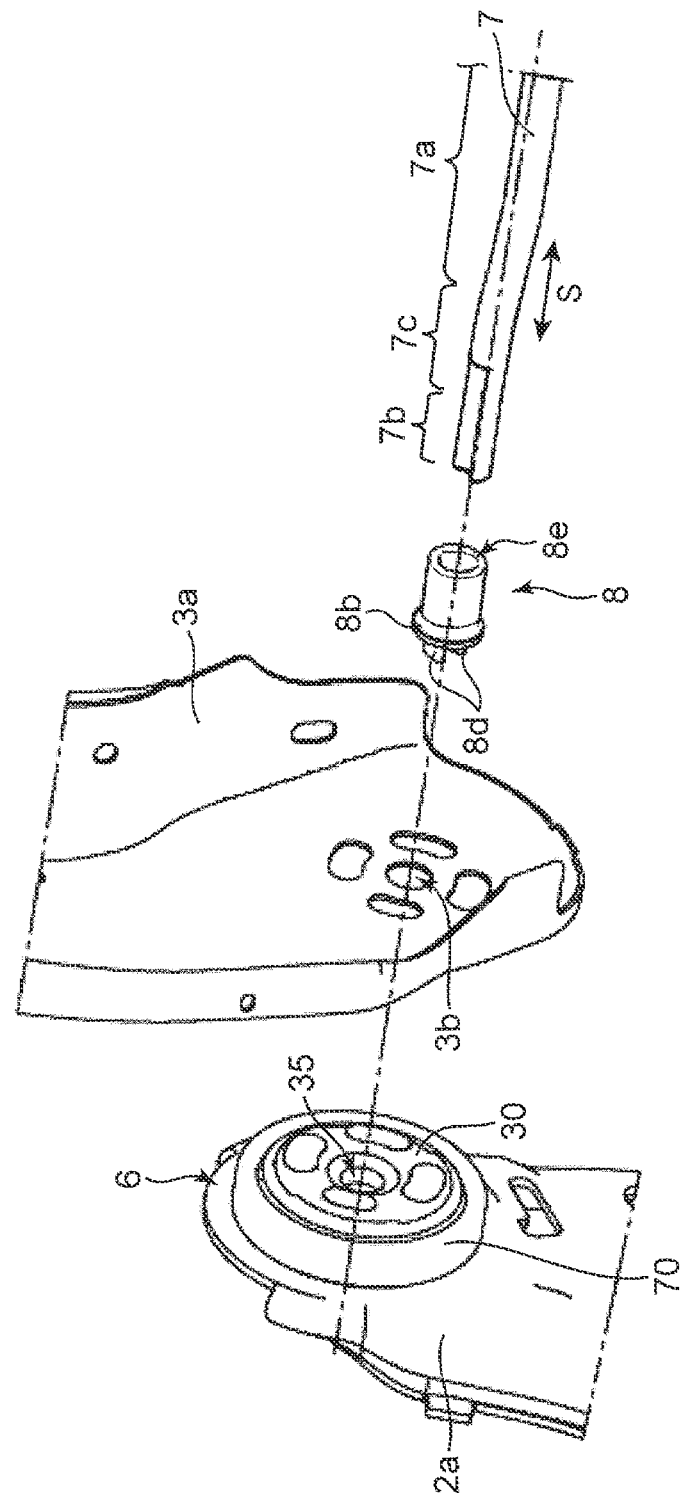
FIG. 3 is a perspective view showing a disassembled state of the connecting rod, the resin bush, and the reclining mechanism shown in FIG. 2.

Specifically, as shown in FIG. 2 to FIG. 3, the reclining device 5 according to the embodiment includes: a pair of reclining mechanism 6; a connecting rod 7 connected to each of the reclining mechanisms 6; and a pair of resin bushes 8 to each receive a fitting part 7c at a portion adjacent to corresponding one of ends 7b of the connecting rod 7.

The reclining mechanisms 6 are respectively arranged on both sides of the seat 1 in a width direction Y thereof. Each of the reclining mechanisms 6 serves as a clutch to fixedly hold the seatback 3 at a certain tilt angle. The configuration of the reclining mechanism will be described in detail later.

Figure 6:
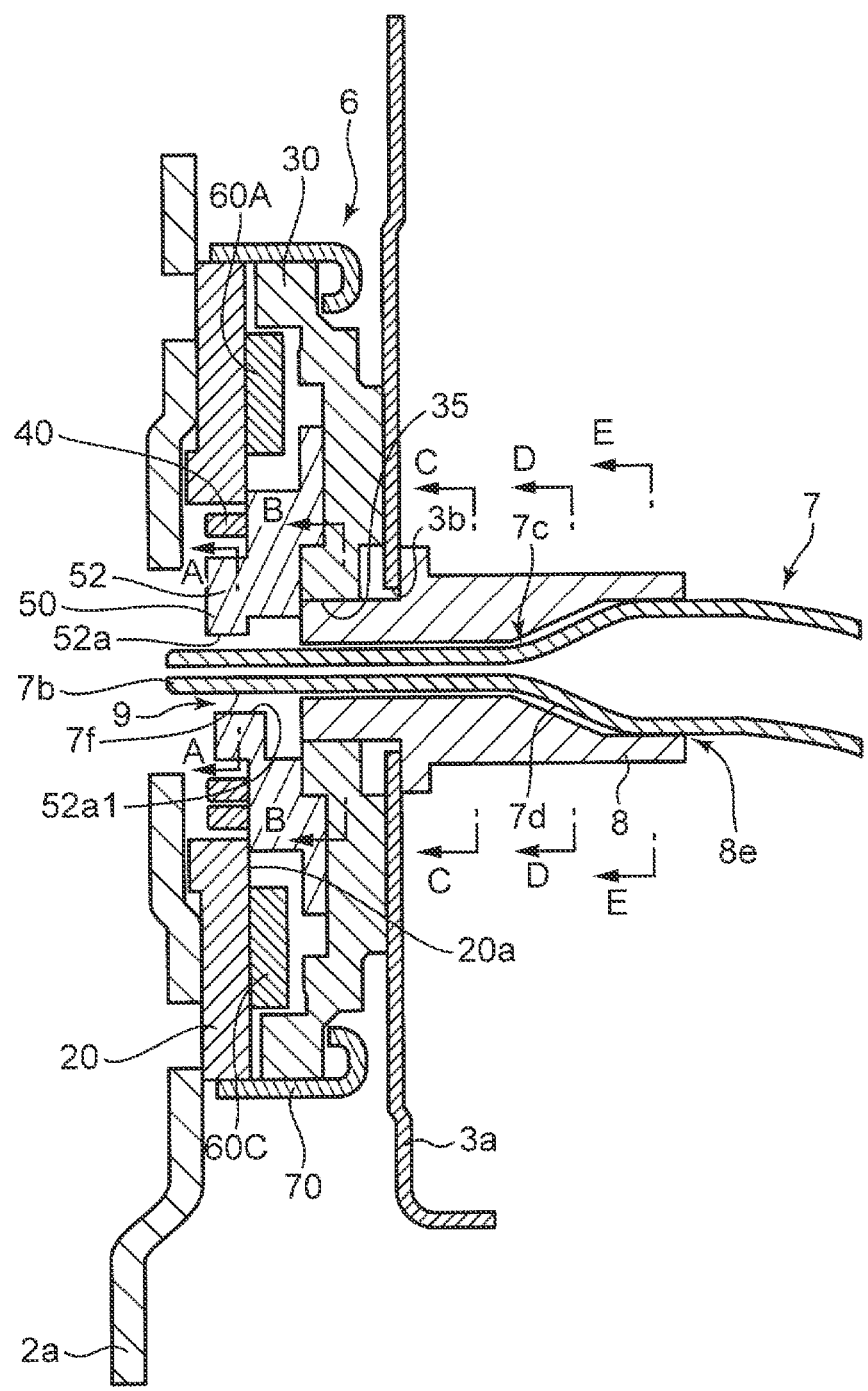
FIG. 6 is a cross-sectional explanatory view of a structure of a main portion of the reclining device shown in FIG. 1 where the connecting rod, the resin bush, and the reclining mechanism as shown in FIG. 2 are assembled together.

As shown in FIG. 3, FIG. 6, and FIG. 9, the reclining mechanism 6 in the embodiment includes: an internal gear 30 fixedly attached to a frame of one of the seat cushion 2 and the seatback 3, that is, to a frame 3a of the seatback 3 (specifically, a side frame forming a side portion of the seatback 3) in the embodiment in a fitting or welding manner; and a cam 50 arranged in juxtaposition with the internal gear 30 in a thickness direction of the internal gear (i.e., in an axial direction S of the connecting rod 7 shown in FIG. 3).

In other words, in the reclining device according to the present invention, the reclining mechanism 6 may include at least the internal gear 30 and the cam 50, and thus the remaining structural components may be appropriately changed.

As shown in FIG. 6 to FIG. 7, FIG. 8A, and FIG. 9, the cam 50 has a rod insertion hole 52a for allowing the end 7b of the connecting rod 7 to be inserted therein. The rod insertion hole 52a has a substantially elliptical shape, specifically, a circular shape inwardly narrowing from specific facing sides, in a cross section (in particular, see FIG. 8A and FIG. 9).

Figure 7:
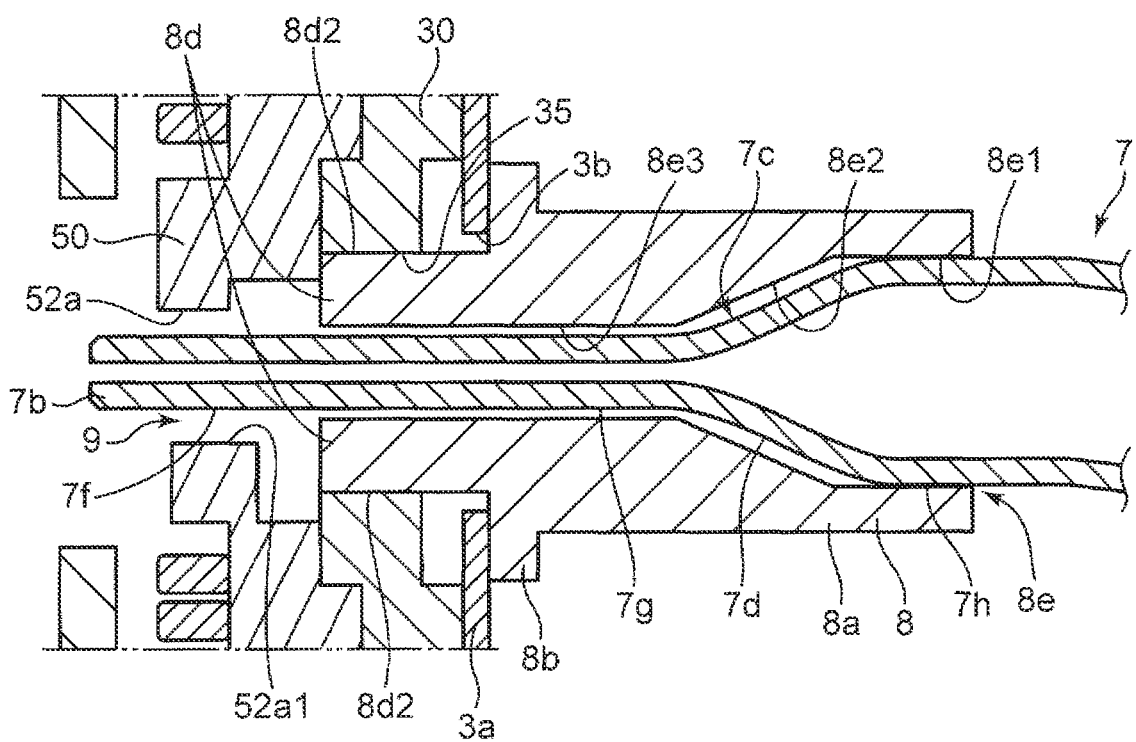
FIG. 7 is an enlarged cross-sectional view of the resin bush shown in FIG. 6 and a periphery therearound.

As shown in FIG. 6 to FIG. 7, and FIG. 9, the internal gear 30 has a bush insertion hole 35 for allowing the resin bush 8 to be inserted therein through a through hole 3b (see FIG. 3, and FIG. 6 to FIG. 7) formed in the frame 3a at a center position of the internal gear 30. The bush insertion hole 35 has a cross-sectionally circular shape.

As shown in FIG. 1 to FIG. 3, the connecting rod 7 is a rod-shaped member extending in the width direction Y of the seat 1 and made of hard material, such as steel.

Figure 5A:
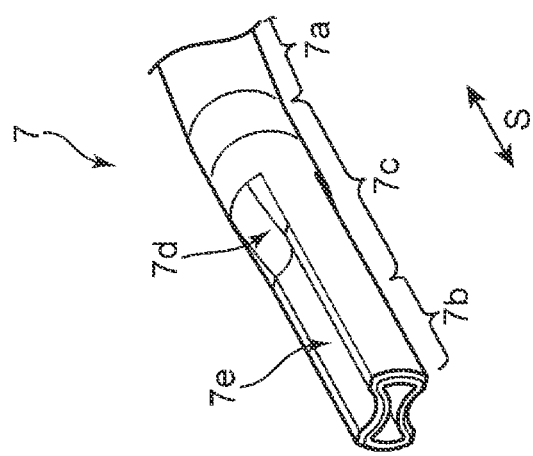
FIG. 5A to FIG. 5C include views of the connecting rod shown in FIG. 3, specifically, FIG. 5A being an enlarged perspective view showing a structure around the end of the connecting rod, FIG. 5B being a view of the end seen from a tip thereof shown in FIG. 5A, and FIG. 5C showing a peripheral structure of the end shown in FIG. 5A as seen from an outer circumference thereof.
Figure 5B:
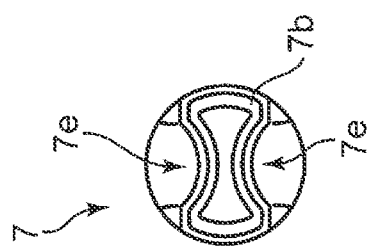
Figure 5C:
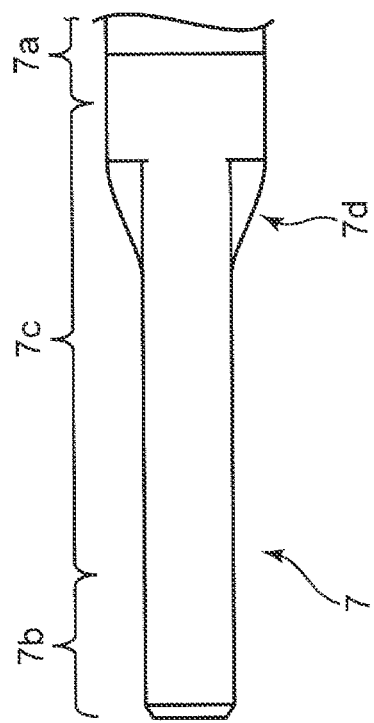

As shown in FIG. 5A to FIG. 5C, the connecting rod 7 specifically has a center part 7a having a cross-sectionally circular shape, the pair of ends 7b on both sides of the center part 7a, and the pair of fitting parts 7c.

Each end 7b has a shape approximate to a substantially elliptical shape conforming to the substantially elliptical shape of the rod insertion hole 52a (see FIG. 8A and FIG. 9) of the cam 50. Specifically, the end 7b has a pair of recesses 7e recessed radially inward at the radially opposite positions to face each other.

Owing to the insertion of the end 7b of the connecting rod 7 into the rod insertion hole 52a of the cam 50 that has the substantially elliptical shape, the connecting rod 7 is coaxially coupled to the cam 50 of each of the pair of reclining mechanisms 6 and can rotate together with the cam 50 (see FIG. 6).

Figure 8A:
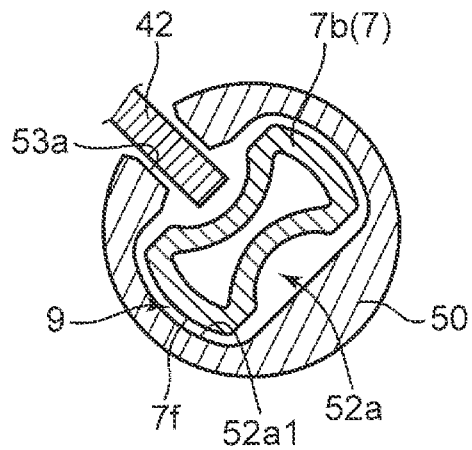
FIG. 8A to FIG. 8E include cross-sectional views taken along respective lines about the connecting rod and the periphery therearound shown in FIG. 6, specifically, FIG. 8A being a cross-sectional view taken along the line A-A, FIG. 8B being a cross-sectional view taken along the line B-B, FIG. 8C being a cross sectional view taken along the line C-C, FIG. 8D being a cross-sectional view taken along the line D-D, and FIG. 8E being a cross-sectional view taken along the line E-E.

As shown in FIG. 6 to FIG. 7, and FIG. 8A, a clearance 9 exists between an inner surface 52*a*1 of the rod insertion hole 52*a* of the cam 50 and an outer surface 7*f* of the end 7*b* of the connecting rod 7 in a state where the end 7*b* of the connecting rod 7 is placed in the rod insertion hole 52*a* of the cam 50, in the same manner as a conventional art. This configuration can accommodate an unfavorable influence attributed to a dimensional difference and distortion of the frame assembly on the operability of the reclining mechanism 6 and a lock load.

As shown in FIG. 5A and FIG. 5C, the fitting part 7*c* of the connecting rod 7 fits to the resin bush 8 at a portion adjacent to the end 7*b* (i.e., adjacent to the end 7*b* at a position closer to the center part 7*a* or at a position between the center part 7*a* and the end 7*b*) on each side of the center part 7*a*. The fitting part 7*c* has a taper section 7*d* narrowing as advancing to the end 7*b* of the connecting rod 7.

Specifically, the fitting part 7*c* has a cross-sectionally circular section 7*h* (see FIG. 7 and FIG. 8E) continuous to the center part 7*a*, a cross-sectionally substantially elliptical section 7*g* (see FIG. 7 and FIG. 8C) continuous to the end 7*b*, and the taper section 7*d* (see FIG. 7 and FIG. 8D) connecting the cross-sectionally circular section 7*h* and the cross-sectionally substantially elliptical section 7*g* to each other therebetween. The cross-sectionally substantially elliptical section 7*g* also has the recess 7*e* continuous from the end 7*b* (see FIG. 5A, FIG. 8A to FIG. 8B).

The taper section 7*d* has such a cross-sectional shape as to gradually change from a circular shape near the cross-sectionally circular section 7*h* to a substantially elliptical shape conforming to the shape of the end 7*b* as advancing to the end 7*b*.

Figure 4:
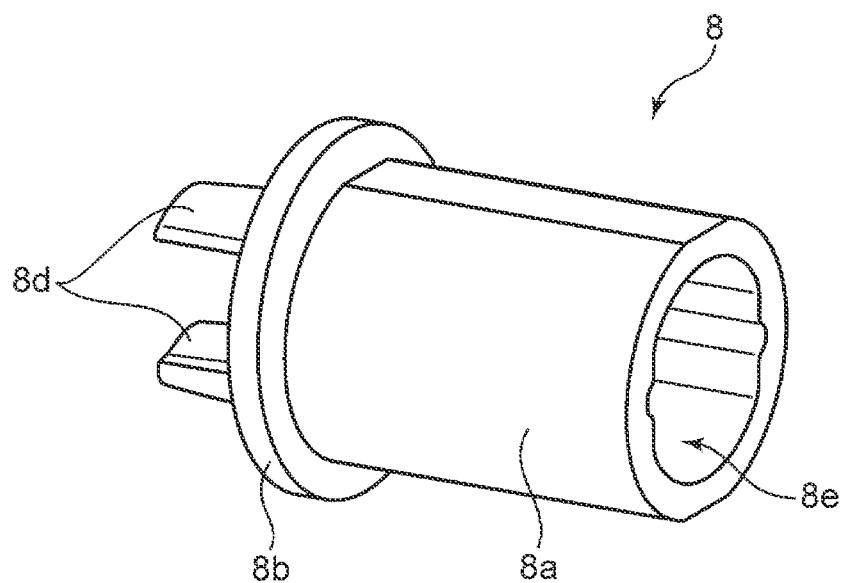
FIG. 4 is a perspective view of the resin bush shown in FIG. 3

The resin bush 8 is made of resin material, and includes a cylindrical body having a fit hole 8*e*, specifically, includes a main body 8*a* having a cylindrical shape, a flange 8*b*, and a pair of claws 8*d* as shown in FIG. 4. The main body 8*a*, the flange 8*b*, and the pair of claws 8*d* are linearly assembled together in the axial direction S (see FIG. 3) of the connecting rod 7.

The resin bush 8 is mainly made of resin material, such as plastic, to prevent an occurrence of an abnormal sound between the connecting rod 7 and the cam 50. The material for the resin bush 8 may be substituted by any material having elasticity, such as rubber (e.g., synthetic rubber) and elastomer. The material for the resin bush 8 may preferably have characteristics of low contact resistance between the internal gear 30 and the frame 3*a*, and less abrasion.

The resin bush 8 has the fit hole 8*e* to receive the fitting part 7*c* at a portion adjacent to the end 7*b* of the connecting rod 7. The fit hole 8*e* axially penetrates the main body 8*a* and the flange 8*b*.

Therefore, as shown in FIG. 6 to FIG. 7 and FIG. 8C to FIG. 8E, the cylindrical main body 8*a* extends in the axial direction S of the connecting rod 7 to support the connecting rod 7 in contact with an entire circumference of the connecting rod in the state where the fitting part 7*c* of the connecting rod 7 fits in the fit hole 8*e* of the resin bush 8.

The fit hole 8*e* of the resin bush 8 has a shape conforming to a contour of the fitting part 7*c* of the connecting rod 7. Specifically, the fit hole 8*e* has a cross-sectionally circular hole section 8*e*1 (see FIG. 7 and FIG. 8E) conforming to the cross-sectionally circular section 7*h* of the fitting part 7*c*, a taper hole section 8*e*2 (see FIG. 7 and FIG. 8D) conforming to the taper section 7*d*, and a cross-sectionally substantially elliptical hole section 8*e*3 (see FIG. 7 and FIG. 8C) conforming to the cross-sectionally substantially elliptical section 7*g*.

The taper hole section 8*e*2 has a taper shape fittable onto the taper section 7*d* of the connecting rod 7 that also has a taper shape. Although a small gap is seen between the taper section 7*d* and an inner surface of the taper hole section 8*e*2 in FIG. 7 and FIG. 8D, the small gap may be excludable.

The flange 8*b* of the resin bush 8 has a circular plate shape extending radially outward from an end periphery edge (specifically, outer end periphery edge in the axial direction S in FIG. 3) of the main body 8*a*. The flange 8*b* is contactable with the frame 3*a* (specifically, a surface of the frame 3*a* opposite to the internal gear 30) of the seatback 3 that is fixedly attached to the internal gear 30 in the axial direction S of the connecting rod 7 in the state where the resin bush 8 is fitted to the fitting part 7*c* of the connecting rod 7 (see FIG. 3, and FIG. 6 to FIG. 7).

As shown in FIG. 4, FIG. 6 to FIG. 7, and FIG. 8B, the pair of claws 8*d* protrudes outward from a surface of the flange 8*b* opposite to the main body 8*a* and extends in the axial direction S of the connecting rod 7 to support the connecting rod 7 on both sides thereof.

Figure 8B:
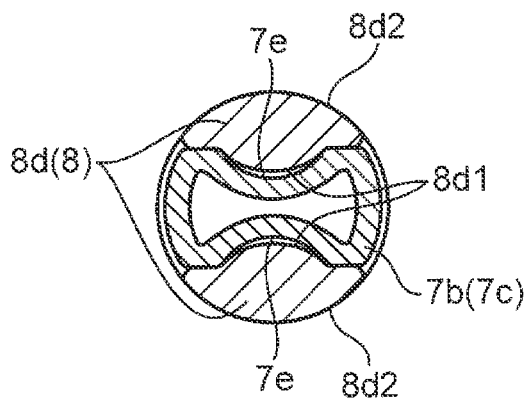

As shown in FIG. 8B, the two claws 8*d* respectively have facing portions 8*d*1 facing each other, each facing portion having a shape (e.g., a recessing or protruding shape) fittable onto the cross-sectionally substantially elliptical section 7*g* of the fitting part 7*c* of the connecting rod 7. Specifically, each of the facing portions 8*d*1 has a protruding shape fittable in the corresponding one of the pair of recesses 7*e* formed in the cross-sectionally substantially elliptical section 7*g* of the fitting part 7*c*.

Moreover, as shown in FIG. 6 to FIG. 7, each of the claws 8*d* has an outer surface 8*d*2 opposite to the connecting rod 7, the outer surface having a shape fittable in the bush insertion hole 35 of the internal gear 30. Specifically, as shown in FIG. 8B, the outer surface 8*d*2 of each of the claws 8*d* curves in an arc shape so that the claws 8*d* are fittable in the bush insertion hole 35 (see FIG. 9) having a cross-sectionally circular shape. In other words, the outer surface 8*d*2 having the arc shape is in surface contact with the inner surface of the bush insertion hole 35 having the cross-sectionally circular shape in the state where the claws 8*d* fit in the bush insertion hole 35. Consequently, a stable fitting state is attainable.

In the reclining device 5 having the above-described configuration, first, the resin bush 8 is fitted to the fitting part 7*c* adjacent to the end 7*b* of the connecting rod 7 for coaxially coupling the end 7*b* of the connecting rod 7 to the reclining mechanism 6, as shown in FIG. 2 to FIG. 3, and FIG. 6 to FIG. 7. At this time, the end 7*b* of the connecting rod 7 protrudes outward of the resin bush 8.

Next, the end 7*b* of the connecting rod 7 and the pair of claws 8*d* of the resin bush 8 are inserted in the bush insertion hole 35 of the internal gear 30 through the through hole 3*b* of the frame 3*a* of the seatback 3. Specifically, the pair of claws 8*d* is fitted in the bush insertion hole 35 so that the outer surface 8*d*2 of each of the claws 8*d* comes into contact with the inner surface and the edge of the bush insertion hole 35. At this time, the resin bush 8 is placed (specifically, fitted) in the bush insertion hole 35 of the internal gear 30 to retain the connecting rod 7 at such a position to the cam 50 that the clearance 9 exists between the inner surface 52*a*1 of the rod insertion hole 52*a* of the cam 50 and the outer surface 7*f* of the end 7*b* of the connecting rod 7. This allows the end 7*b* of the connecting rod 7 to fit in the bush insertion hole 35 of the internal gear 30 while permitting the clearance 9 to exist. In the state where the resin bush 8 is placed (fitted) in the bush insertion hole 35, the outer surface 8d2 of each of the claws 8d may be in contact with at least a part of the inner surface of the bush insertion hole 35, and may not be necessarily in contact with the edge of the inner surface of the bush insertion hole 35.

In this configuration, the resin bush 8 is rotatable together with the connecting rod 7 and the cam 50 in the state where the pair of claws 8d fits in the bush insertion hole 35 of the internal gear 30.

Detailed Configuration of the Reclining Mechanism 6

Hereinafter, a detailed configuration of the reclining mechanism 6 in the embodiment will be described. As described above, the reclining mechanism 6 may include at least the internal gear 30 and the cam 50 in the present invention. Hence, the remaining structural components may be appropriately changed.

The reclining mechanism 6 is provided between a frame 2a of the seat cushion 2 and the frame 3a of the seatback 3 (see FIG. 2 to FIG. 3).

As shown in FIG. 9, the reclining mechanism 6 includes a guide bracket 20, the internal gear 30, a spiral spring 40, the cam 50, four locking plates 60A to 60D, and an attachment ring 70.

As shown in FIG. 3 and FIG. 6, the guide bracket 20 is fixed around the rear of the frame 2a (specifically, a side frame) of the seat cushion 2. The internal gear 30 is fixed around a lower portion of the frame 3a (specifically, a side frame) of the seatback 3.

In an arrangement of the frame 2a of the seat cushion 2 inside the frame 3a of the seatback 3 as shown in FIG. 3, the internal gear 30 may be fixedly attached to the frame 2a of the seat cushion 2, and the guide bracket 20 may be fixedly attached to the frame 3a of the seatback 3.

As shown in FIG. 9, the guide bracket 20 has a disc shape, and has an arrangement hole 22 penetrating therethrough at a center thereof for arrangement of the spiral spring 40 therein. An inner surface of the arrangement hole 22 is formed with an engagement groove 22a. The engagement groove 22a is engaged with an outer end 41 of the spiral spring 40.

The internal gear 30 has a circular shape in a plan view and further has a cross-sectionally substantially recess shape. The internal gear includes a recess section 31 having an inner surface formed with inner teeth 32. The recess section 31 faces an inner surface 20a (see FIG. 6) of the guide bracket 20. The internal gear 30 is coupled to, for example, the frame 3a of the seatback 3 via a connection protrusion 34 protruding in a right depth direction on the paper of FIG. 9.

The guide bracket 20 and the internal gear 30 are retained by the attachment ring 70 at such positions that the guide bracket 20 faces the recess section 31 of the internal gear 30 and an end surface 31a1 of a peripheral wall 31a of the recess section 31 comes into contact with a surface of the guide bracket 20.

The attachment ring 70 has an annular bottom plate 71 having an annular shape with a predetermined width in a substantially circle, and an annular side plate 72 extending in a direction substantially perpendicularly intersecting the outer edge of the annular bottom plate 71, that is, extending along an outer surface 31a2 of the peripheral wall 31a of the internal gear 30. In other words, the attachment ring 70 has a substantially L-shape defined by the annular bottom plate 71 and the annular side plate 72 in a radial cross-section.

In the embodiment, the attachment ring 70 covers the guide bracket 20 and the internal gear 30 in such a manner that an end edge 72a of the annular side plate 72 extends over the outer surface 31a2 of the peripheral wall 31a of the internal gear 30 to reach an outer surface 21b of the guide bracket located beyond the outer surface 31a2 (on the left front side of paper of FIG. 9) in a state where the guide bracket 20 and the recess section 31 of the internal gear 30 face each other to define an inner space therebetween for accommodating the spiral spring 40, the cam 50, and the lock mechanism including the locking plates 60A to 60D therein. In this assembling manner, a central protrusion of the internal gear 30 is exposed outward farther than an inner circle of the annular bottom plate 71 (exposed in the right depth direction on the paper of FIG. 9). After the attachment of the attachment ring 70 in this way, a portion of the annular side plate 72 that faces the outer surface 21b of the guide bracket 20 is fixedly welded to the outer surface 21b. Hence, the guide bracket 20 and the internal gear 30 rotate relative to each other, when the seatback 3 is rotated relative to the seat cushion 2 in a state where the guide bracket 20 is fixedly attached to, for example, the frame 2a of the seat cushion 2 and the connection protrusion 34 of the internal gear 30 is fixedly attached to, for example, the frame 3a of the seatback 3. The attachment ring 70 rotates together with the guide bracket 20 relative to the internal gear 30. The annular side plate 72 of the attachment ring 70 restricts a radial shift of the internal gear 30. The annular bottom plate 71 of the attachment ring restricts an axial shift of the internal gear 30.

The cam 50 is a member for reciprocally moving the locking plates 60A to 60D in a radial direction of the cam 50. The cam 50 is provided with four engaging protrusions 51, 51 corresponding to the four locking plates 60A to 60D at equal intervals in a circumferential direction, each engaging protrusion having a horn-like shape extending in a substantially arc. A main body 52 of the cam 50, from which the engaging protrusions 51, 51 are excluded, is provided with four bulges 52b, 52b each bulging outward to have a larger outer diameter at a predetermined angle from a base part of each of the engaging protrusions 51, 51. The cam 50 is integrally fixed to a surface of a spacer 55, and has the rod insertion hole 52a penetrating the center of the cam 50 to receive the end 7b of the connecting rod 7 inserted therein. When a manipulation member (not shown) attached to the end 7b of the connecting rod 7 is used to rotate the connecting rod 7 forward or backward, the cam 50 rotates in the same direction by following the connecting rod.

The cam 50 has a first shaft 53 protruding from a periphery of the rod insertion hole 52a toward the guide bracket 20 on a surface facing the guide bracket 20. The first shaft 53 has an outer diameter smaller than an inner diameter of the spiral spring 40, and the first shaft 53 is formed with an engagement slit 53a notched from an outer surface of the shaft toward a center thereof. The spiral spring 40 is arranged to surround the first shaft 53, and has an inner end 42 engageable with the engagement slit 53a of the first shaft 53 (see FIG. 8A) so as to be placed in the arrangement hole 22 of the guide bracket 20 together with the first shaft 53. The spiral spring 40 urges the cam 50 in one rotational direction due to the engagement of the outer end 41 with the engagement groove 22a on the inner surface of the arrangement hole 22 of the guide bracket 20.

The internal gear 30 is provided with a second shaft 36 protruding toward the cam 50 at the center of the internal gear. The second shaft 36 is inserted in a bearing hole (not shown) formed in the cam 50 to rotatably support the cam 50.

The four locking plates 60A to 60D are used in the embodiment. The four locking plates 60A to 60D are respectively arranged to meet the four engaging protrusions 51, 51 each having a horn-like shape in the cam 50. Each of the locking plates 60A to 60D is slidable in a radial direction of the guide bracket 20 along a guide groove (not shown) formed in the guide bracket 20 and extending in the radial direction thereof.

Concerning the locking plates 60A to 60D and the cam 50, the locking plates 60A to 60D are urged radially outward in response to a one-directional rotation of the cam 50 attributed to the elasticity of the spiral spring 40, and the locking plates 60A to 60D shift toward the center in response to a reverse-directional rotation of the cam 50 by the connecting rod 7. Each of the locking plates 60A to 60D has a substantially rectangular shape in a plan view. The locking plates 60A to 60D respectively have engaged grooves 61, 61 each notched in a substantially arc form from an inner surface of the corresponding plate. When the cam 50 rotates in a clockwise direction, the engaging protrusions 51, 51 engage with the corresponding engaged grooves 61, 61 to pull the locking plates 60A to 60D toward the center of the cam 50. When the cam 50 is urged by the spiral spring 40 and rotates in a counter-clockwise direction, the engaging protrusions 51, 51 and the bulges 52b, 52b press the locking plates 60A to 60D radially outward of the cam 50. The locking plates 60A to 60D have outer surfaces respectively formed with outer teeth 63, 63 to mesh with the inner teeth 32 of the internal gear 30 when the plates are pressed radially outward, thereby locking the guide bracket 20 and the internal gear 30 irrotationally relative to each other. This achieves fixed holding of the seatback 3 at a certain tilt angle.

Characteristics of the Embodiment (1) The reclining device 5 according to the embodiment fixedly holds the seatback 3 shown in FIG. 1 to the seat cushion 2 in a tiltable manner and fixes the seatback at a certain tilt angle.

As shown in FIG. 1 to FIG. 6, the reclining device 5 includes: the pair of reclining mechanisms 6 arranged on both sides of the seat 1 in the width direction Y thereof, and each having the internal gear 30 fixedly attached to the frame of one of the seat cushion 2 and the seatback 3 (to the frame 3a of the seatback 3 in the embodiment), and the cam 50 arranged in juxtaposition with the internal gear 30 in the thickness direction (i.e., width direction Y) of the internal gear; and the connecting rod 7 extending in the width direction Y of the seat 1, coaxially coupled to the cam 50 of each of the reclining mechanisms 6, and being rotatable together with the cam 50.

The reclining device 5 according to the embodiment further includes the resin bush 8 having a cylindrical shape formed with the fit hole 8e to receive the fitting part 7c at a portion adjacent to each end 7b of the connecting rod 7.

As shown in FIG. 6 to FIG. 7, the cam 50 has the rod insertion hole 52a for allowing the end 7b of the connecting rod 7 to be inserted therein. The internal gear 30 has the bush insertion hole 35 for allowing the resin bush 8 to be inserted therein at the center position of the internal gear 30.

As shown in FIG. 6 to FIG. 7, and FIG. 8A, the fitting part 7c adjacent to the end 7b of the connecting rod 7 fits in the fit hole 8e of the resin bush 8, and the end 7b of the connecting rod 7 protrudes outward of the resin bush 8. The resin bush 8 is placed in the bush insertion hole 35 in contact with the inner surface of the bush insertion hole 35 of the internal gear 30 to retain the connecting rod 7 at such a position to the cam 50 that the clearance 9 exists between the inner surface 52a1 of the rod insertion hole 52a of the cam 50 and the outer surface 7f of the connecting rod 7.

According to this configuration, the resin bush 8 is placed in the bush insertion hole 35 in contact with the inner surface of the bush insertion hole 35 of the internal gear 30 to retain the connecting rod 7 at such a position to the cam 50 that the clearance 9 exists between the inner surface 52a1 of the rod insertion hole 52a of the cam 50 and the outer surface 7f of the connecting rod 7. In this manner, the resin bush 8 restricts the shift of the connecting rod 7 relative to the cam 50 in the radial direction of the cam 50, and thus can prevent an occurrence of a contact sound between the cam 50 and the connecting rod 7. This results in achieving effective prevention of abnormal sound while permitting the clearance 9 to exist between the inner surface 52a1 of the rod insertion hole 52a of the cam 50 and the outer surface 7f of the connecting rod 7.

Besides, the resin bush 8 is not designed to determine relative positions of the cam 50 and the connecting rod 7 by intervening therebetween, but is designed to retain the connecting rod 7 at a specific position in a state of being placed in the bush insertion hole 35 of the internal gear 30. Therefore, the resin bush 8 receives no dimensional restriction due to the clearance 9 between the cam 50 and the connecting rod 7 and no stiffness restriction based on such dimensional restriction. In this respect, the resin bush 8 can be set to a dimension and stiffness leading to less abrasion than those of the elastic ring of the conventional art (structure described in Patent Literature 1).

(2) In the reclining device 5 according to the embodiment, the fit hole 8e of the resin bush 8 has a shape conforming to the contour of the fitting part 7c of the connecting rod 7. Specifically, as shown in FIG. 7 and FIG. 8C to FIG. 8E, the fit hole 8e has the cross-sectionally circular hole section 8e1, the taper hole section 8e2, and the cross-sectionally substantially elliptical hole section 8e3.

According to this configuration, a work of attaching the resin bush 8 to the fitting part 7c at a portion of the connecting rod 7 adjacent to the end 7b is completed only by fitting the fitting part 7c adjacent to the end 7b of the connecting rod 7 in the fit hole 8e of the resin bush 8. Thus the work has good workability. Furthermore, a simple configuration of the connecting rod 7 and the resin bush 8 in combination succeeds in preventing the resin bush 8 from axially coming off the internal gear 30 and further preventing the resin bush 8 from falling off the connecting rod 7.

(3) In the reclining device 5 according to the embodiment, as shown in FIG. 3 to FIG. 4 and FIG. 6 to FIG. 7, the resin bush 8 has the flange 8b coming into contact with the frame 3a of the seatback 3, which is fixedly attached to the internal gear 30, in the axial direction S of the connecting rod 7.

According to this configuration, the flange 8b of the resin bush 8 can restrict the shift of the resin bush 8 in the axial direction S by coming into contact with the frame 3a of the seatback 3 in the axial direction S of the connecting rod 7.

Moreover, the flange 8b can prevent an unacceptable matter from entering the reclining mechanism 6 through the through hole 3b by closing a gap between the resin bush 8 and an inner surface of the through hole 3b of the frame 3a.

(4) In the reclining device 5 according to the embodiment, the resin bush 8 has the main body 8a extending in the axial direction S of the connecting rod 7 and having a cylindrical shape to support the connecting rod 7 in contact with an entire circumference of the connecting rod.

According to this configuration, the cylindrical main body 8a of the resin bush 8 supports the connecting rod 7 in contact with the entire circumference of the connecting rod, and therefore can further restrict the shift of the connecting rod 7 relative to the cam 50 in the radial direction thereof. As a result, the effect of abnormal sound occurrence prevention is improved.

(5) In the reclining device 5 according to the embodiment, as shown in FIG. 5 to FIG. 7, the fitting part 7c of the connecting rod 7 has the taper section 7d narrowing as advancing to the end 7b of the connecting rod 7. As shown in FIG. 7 and FIG. 8D, the fit hole 8e of the resin bush 8 has the taper hole section 8e2 fittable to the taper section 7d of the connecting rod 7.

According to this configuration, the taper section 7d formed at the fitting part 7c adjacent to the end 7b of the connecting rod 7 fits to the taper hole section 8e2 of the fit hole 8e of the resin bush 8 to restrict the shift of the resin bush 8 in the axial direction. Furthermore, a simple configuration of the connecting rod 7 and the resin bush 8 in combination succeeds in preventing the resin bush 8 from axially coming off the internal gear 30 and further preventing the resin bush 8 from falling off the connecting rod 7 without increasing the number of components.

(6) In the reclining device 5 according to the embodiment, as shown in FIG. 4, FIG. 6 to FIG. 7, and FIG. 8B, the resin bush 8 has the pair of claws 8d extending in the axial direction S of the connecting rod 7 to support the connecting rod 7 on both sides thereof.

According to this configuration, the claws 8d of the resin bush 8 support the connecting rod 7 on both sides thereof, and therefore can further restrict the shift of the connecting rod 7 relative to the cam 50 in the radial direction. As a result, the effect of abnormal sound occurrence prevention is improved.

(7) In the reclining device 5 according to the embodiment, as shown in FIG. 8B, each of the facing portions 8d1 of the claws 8d facing each other has a shape fittable onto the fitting part 7c of the connecting rod 7. Specifically, each of the facing portions 8d1 has a protruding shape fittable in the corresponding recess 7e in the cross-sectionally substantially elliptical section 7g of the fitting part 7c.

According to this configuration, each of the facing portions 8d1 of the claws 8d of the resin bush 8 that face each other fit to the fitting part 7c adjacent to the end 7b of the connecting rod 7, and therefore can further restrict the shift of the connecting rod 7 relative to the cam 50 in the radial direction. As a result, the effect of abnormal sound occurrence prevention is improved.

(8) In the reclining device 5 according to the embodiment, as shown in FIG. 6 to FIG. 7 and FIG. 8B, each of the claws 8d has the outer surface 8d2 opposite to the connecting rod 7. The outer surface 8d2 of each of the two claws 8d has a shape fittable in the bush insertion hole 35 of the internal gear 30. In other words, the outer surface 8d2 of each claw 8d has an arc shape fittable in the bush insertion hole 35 having the cross-sectionally circular shape.

According to this configuration, the pair of claws 8d of the resin bush 8 can more effectively support the connecting rod 7 on both sides thereof owing to fitting of the pair of claws 8d in the bush insertion hole 35 of the internal gear 30. This enables further restriction of the shift of the connecting rod 7 relative to the cam 50 in the radial direction. In addition, the mere fitting of the pair of claws 8d in the bush insertion hole 35 facilitates determination on the positions of the resin bush 8 and the connecting rod 7, resulting in improvement of the workability in the assembly of the reclining device 5.

(9) As shown in FIG. 1 to FIG. 7, the seat 1 according to the embodiment includes: the seat cushion 2; the seatback 3 arranged in the rear of the seat cushion 2 and being tiltable in the front-rear direction X of the seat 1; and the reclining device 5 having the above-described configuration for fixedly holding the seatback 3 at a certain tilt angle.

The seat 1 includes the reclining device 5 having the configuration where the resin bush 8 is placed in the bush insertion hole 35 in contact with the inner surface of the bush insertion hole 35 of the internal gear 30 to retain the connecting rod 7 in the state where the clearance 9 exists between the inner surface 52a1 of the rod insertion hole 52a of the cam 50 and the outer surface 7f of the connecting rod 7. In this manner, the resin bush 8 restricts the shift of the connecting rod 7 relative to the cam 50 in the radial direction of the cam 50. This results in achieving effective prevention of abnormal sound while permitting the clearance 9 to exist between the inner surface 52a1 of the rod insertion hole 52a of the cam 50 and the outer surface 7f of the connecting rod 7.

Modifications

As shown in FIG. 4 and FIG. 7, the main body 8a of the resin bush 8 in the embodiment has such a length as to be fittable to the entirety of the fitting part 7c of the connecting rod 7, i.e., to be fittable to the cross-sectionally circular section 7h and the taper section 7d in addition to the cross-sectionally substantially elliptical section 7g. However, in the present invention, the length of the main body 8a of the resin bush 8 is not particularly limited.

Figure 10:
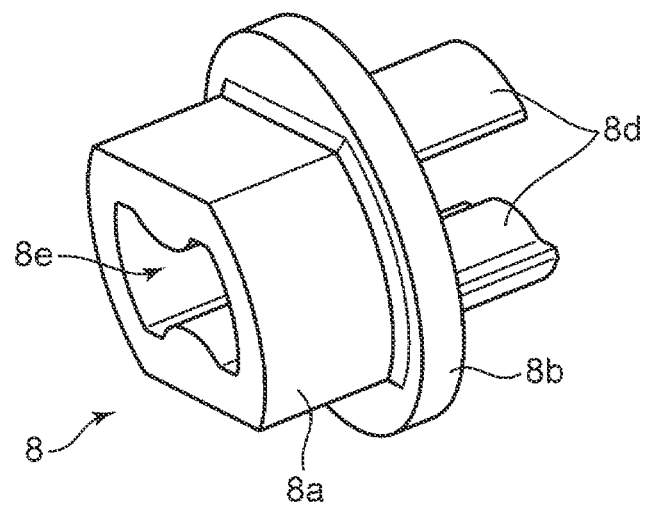
FIG. 10 is a perspective view of the resin bush having an improved main body, according to a modification of the present invention.
Figure 11A:
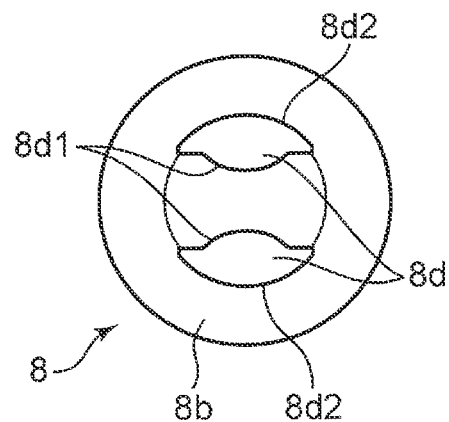
FIG. 11A to FIG. 11E include views of the resin bush shown in FIG. 10, specifically, FIG. 11A being a side view of the resin bush seen from a leading end of a claw, FIG. 11B being a front view of the resin bush, FIG. 11C being a side view thereof seen from a leading end of the main body, FIG. 11D being a cross-sectional view taken along the line F-F in FIG. 11C, and FIG. 11E being a plan view.
Figure 11B:
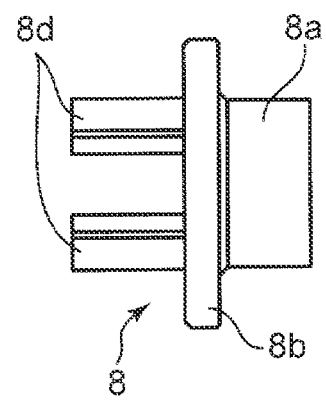
Figure 11C:
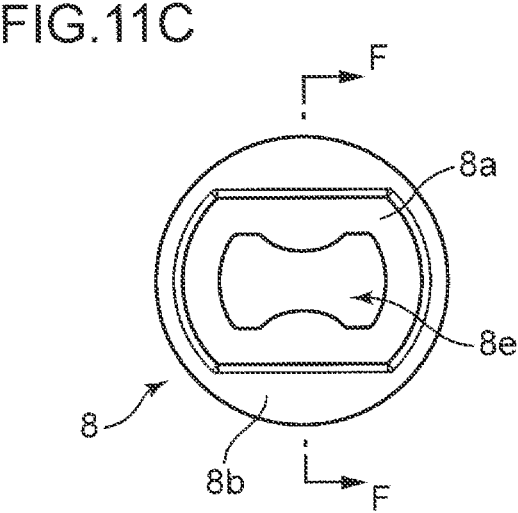
Figure 11D:
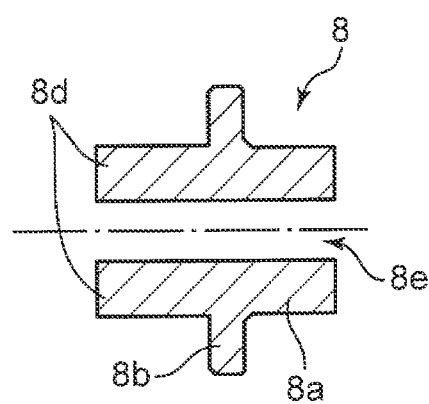
Figure 11E:
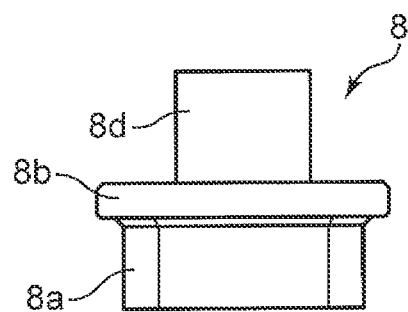
Figure 12:
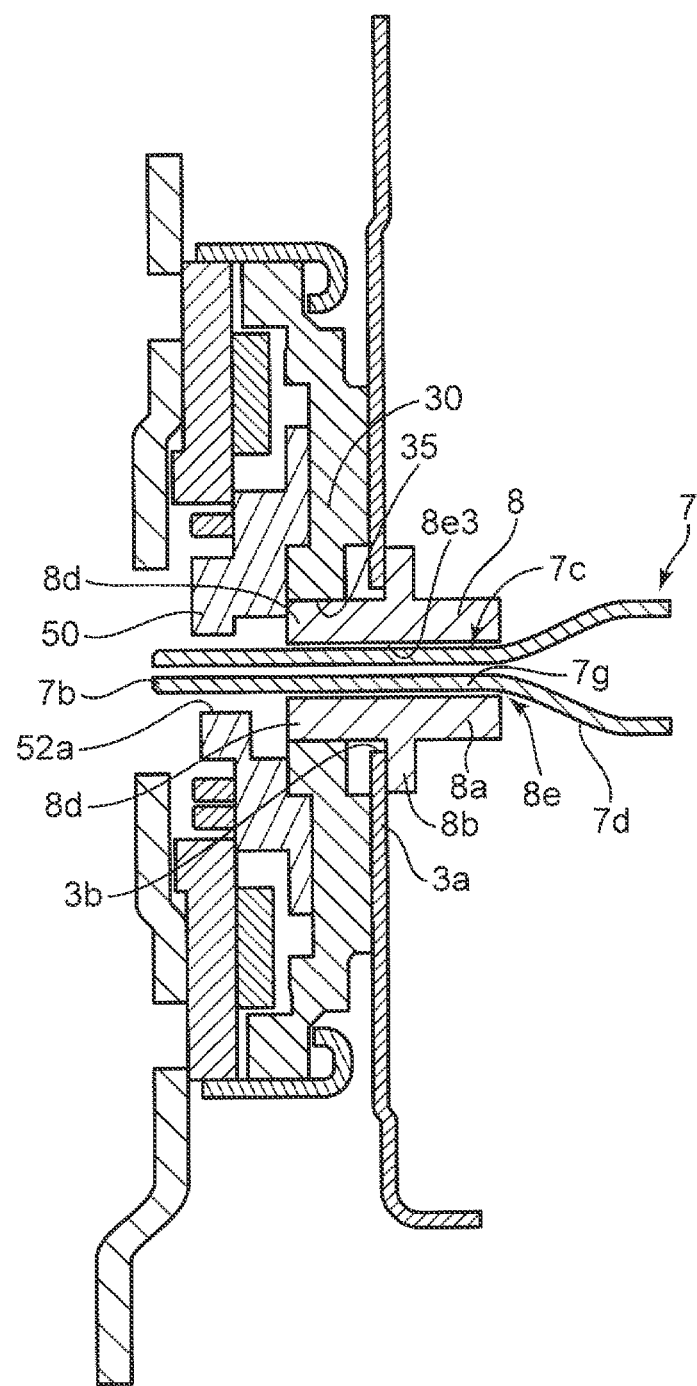
FIG. 12 is a cross-sectional explanatory view of a structure of the resin bush shown in FIG. 10, and the connecting rod and the reclining mechanism shown in FIG. 6, as assembled together.

Therefore, in a modification of the present invention as shown in FIG. 10 to FIG. 12, the length of a main body 8a of a resin bush 8 may be changed to be fittable only to a cross-sectionally substantially elliptical section 7g.

In the modification shown in FIG. 10 to FIG. 12, downsizing of the resin bush 8 is attainable by decreasing the length of the main body 8a.

Figure 8C:
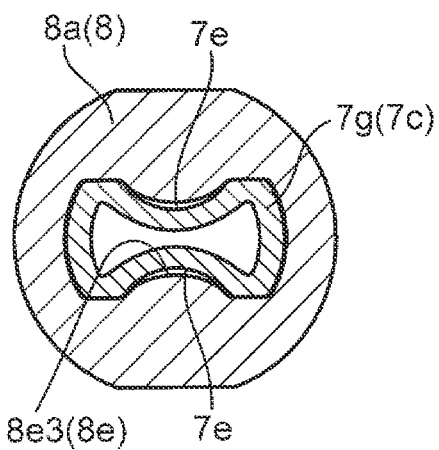
Figure 8D:
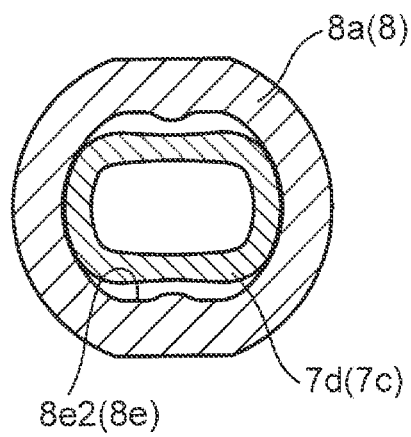
Figure 8E:
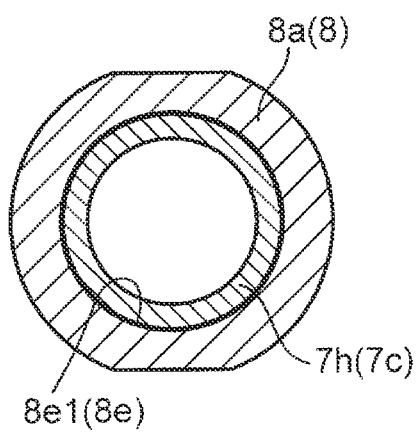

Even in the modification shown in FIG. 10 to FIG. 12, the cross-sectionally substantially elliptical section 7g (i.e., the section having the recess 7e shown in FIG. 8B to FIG. 8C) of the connecting rod 7 can restrict the shift of the connecting rod 7 relative to the cam 50 in a radial direction thereof by fitting in the fit hole 8e (specifically, the cross-sectionally substantially elliptical hole section 8e3 as shown in FIG. 8C) of the main body 8a of the resin bush 8 and fitting to the protruding facing portions 8d1 of the pair of claws 8d. As a result, the effect of abnormal sound occurrence prevention is improved.

In the modification, as shown in FIG. 12, although the resin bush 8 is not fitted to the taper section 7d of the connecting rod 7, the taper section 7d is arranged in adjacent to the attachment position of the resin bush 8. This arrangement makes it possible to prevent the resin bush 8 from deviating in the axial direction and coming off (specifically, coming off the through hole 3b of the frame 3a and coming off the bush insertion hole 35 of the internal gear 30).

The resin bush 8 in the modification has a pair of flat surfaces facing each other on a circumference of the main body 8a, as shown in FIG. 10, FIG. 11C, and FIG. 11E. Thus, a rotation angle of each of the resin bush 8 and the connecting rod 7 is easily adjustable by using a tool.

Figure 13:
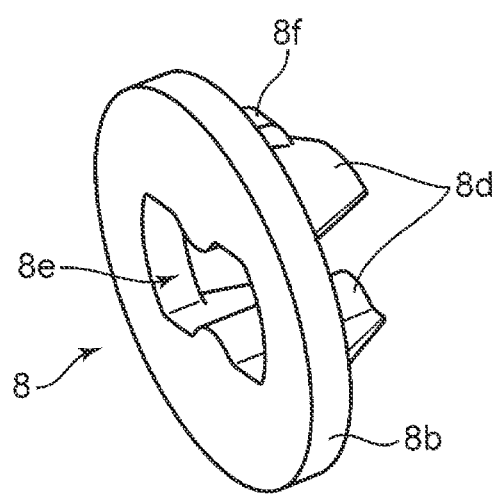
FIG. 13 is a perspective view of a small-type resin bush having an engagement part engageable with a frame, according to another modification of the present invention.
Figure 14A:
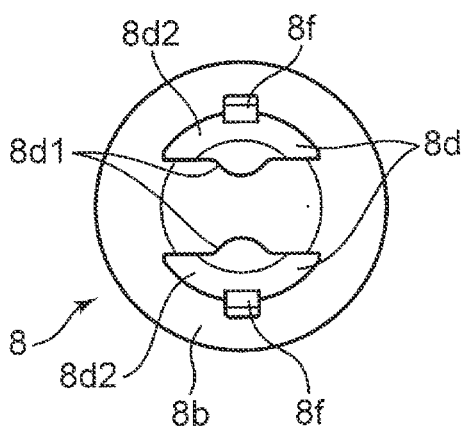
FIG. 14A to FIG. 14E include views of the resin bush shown in FIG. 13, specifically, FIG. 14A being a side view of the resin bush seen from a leading end of a claw, FIG. 14B being a front view of the resin bush, FIG. 11C being a side view seen in a direction of facing a flat surface of a flange, FIG. 14D being a cross-sectional view taken along the line G-G in FIG. 14C, and FIG. 14E being a plan view.
Figure 14B:
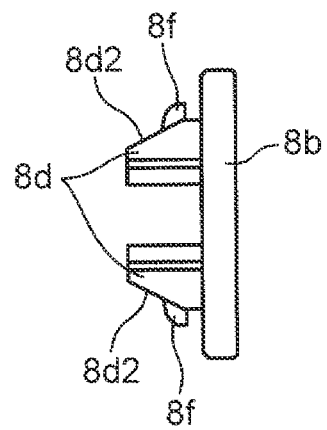
Figure 14C:
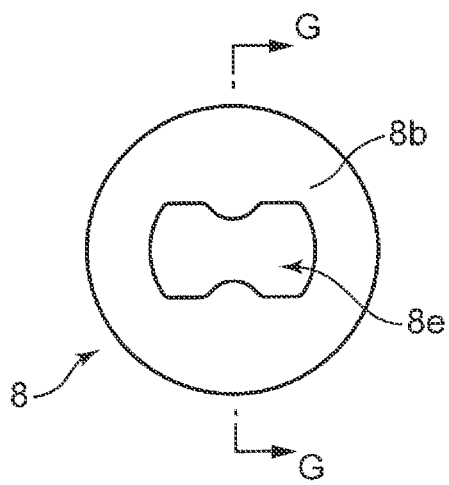
Figure 14D:
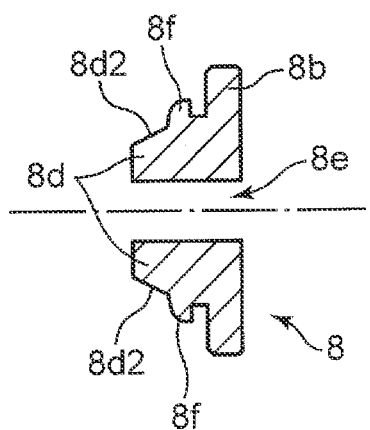
Figure 14E:
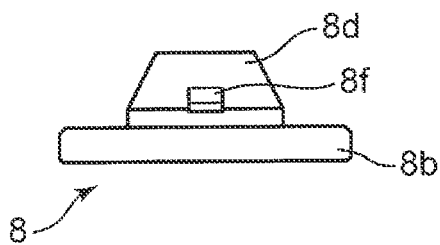
Figure 15:
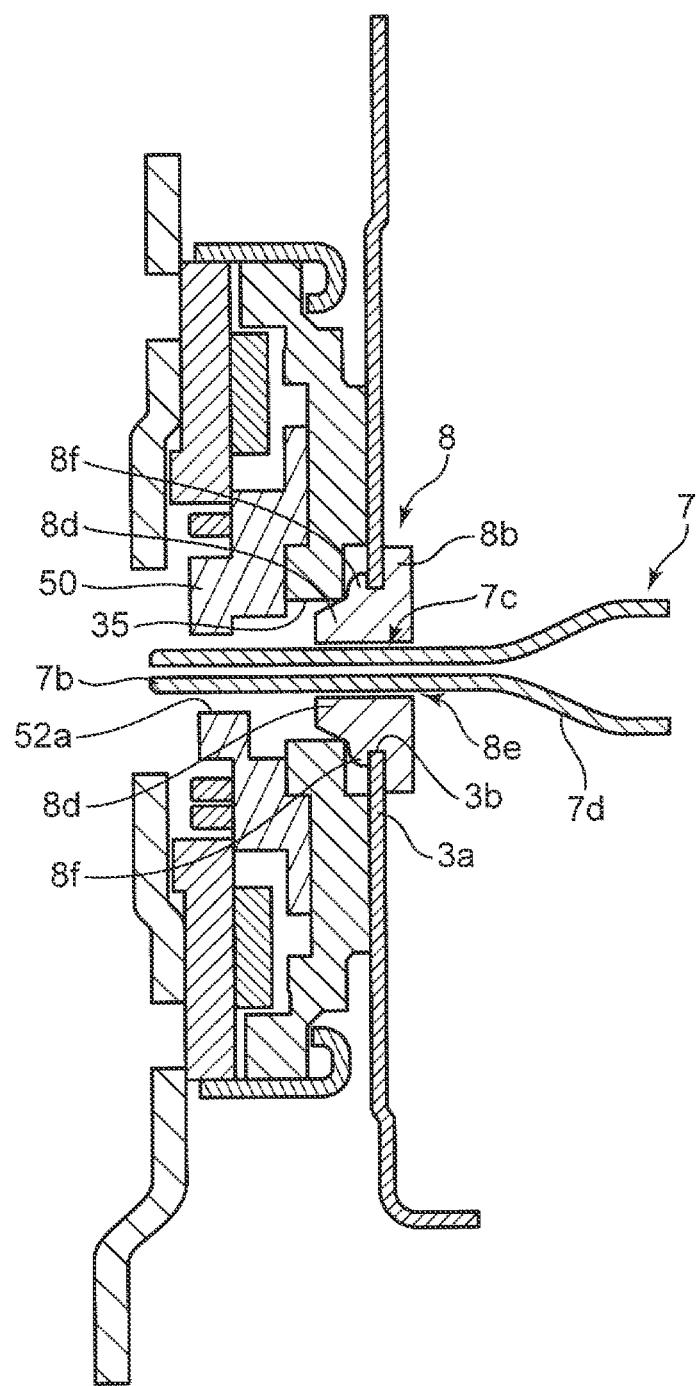
FIG. 15 is a cross-sectional explanatory view of a structure of the resin bush shown in FIG. 13, and the connecting rod and the reclining mechanism shown in FIG. 6, as assembled together.

In another modification of the present invention as shown in FIG. 13 to FIG. 15, a resin bush 8 may be configured to exclude a main body 8a and have an engagement part 8f engageable with a frame 3a.

The engagement part 8f is configured to be engageable with the frame 3a of the seatback 3 that is fixedly attached to the internal gear 30, for example, has a claw engageable with an edge of the through hole 3b of the frame 3a. The engagement part 8f protrudes radially outward of the resin bush 8 from an outer surface 8d2 of each of a pair of claws 8d.

In the modification in FIG. 13 to FIG. 15, the engagement part 8f of the resin bush 8 engages with the frame 3a (specifically, the edge of the through hole 3b) of the seatback 3 that is fixedly attached to the internal gear 30. This can prevent the resin bush 8 from coming off the frame 3a. Moreover, the resin bush 8 is firmly fixed by both the frame 3a and the internal gear 30. The resin bush 8 therefore can restrict the shift of the connecting rod 7 relative to the cam 50 in the radial direction of the cam 50. As a result, the effect of abnormal sound occurrence prevention is improved.

In a case where the internal gear 30 is fixedly attached to the frame 2a of the seat cushion 2, the engagement part 8f may engage with the frame 2a of the seat cushion 2.

In the modification shown in FIG. 13 to FIG. 15, each of the pair of claws 8d of the resin bush 8 has an outer surface 8d2 opposite to the connecting rod 7. The outer surface 8d2 has a taper shape slanting to the center of the bush insertion hole 35 as advancing to a leading end of the claw 8d to come into contact with the edge of the bush insertion hole 35 of the internal gear 30. The edge falls within the inner surface of the bush insertion hole 35. In this configuration, the pair of claws 8d of the resin bush 8 is placed in the bush insertion hole 35 in contact with the edge of the bush insertion hole 35, and thus can retain the connecting rod 7 at such a position to the cam 50 that the clearance 9 exists between the inner surface 52a1 of the rod insertion hole 52a of the cam 50 and the outer surface 7f of the connecting rod 7.

According to this configuration, the outer surface 8d2 having the taper shape in each of the claws 8d of the resin bush 8 comes into contact with the edge of the bush insertion hole 35 of the internal gear 30, thereby succeeding in reliably maintaining the contact state between the resin bush 8 and the internal gear 30. Moreover, this configuration can accommodate a dimensional difference in one of the bush insertion hole 35 and the pair of claws 8d, or both the insertion hole and the claws.

In the modification shown in FIG. 13 to FIG. 15, downsizing of the resin bush 8 is attainable by excluding the main body 8a.

Furthermore, as shown in FIG. 15, although the resin bush 8 is not fitted to the taper section 7d of the connecting rod 7, the taper section 7d is arranged in adjacent to the attachment position of the resin bush 8. This arrangement makes it possible to prevent the resin bush 8 from deviating in the axial direction and coming off (specifically, coming off the through hole 3b of the frame 3a and coming off the bush insertion hole 35 of the internal gear 30).

Summary of Embodiment

The embodiment is summarized in the following manner.

A reclining device according to the embodiment is a reclining device for holding a seatback to a seat cushion in a tiltable manner and fixing the seatback at a fixed tilt angle. The reclining device includes: a pair of reclining mechanisms arranged on both sides of a seat in a width direction thereof, and each having an internal gear fixedly attached to a frame of one of the seat cushion and the seatback and a cam arranged in juxtaposition with the internal gear in a thickness direction of the internal gear; a connecting rod extending in the width direction of the seat, coaxially coupled to the cam of each of the reclining mechanisms, and being rotatable together with the cam; and a resin bush having a cylindrical shape formed with a fit hole to receive a fitting part formed on the connecting rod at a portion adjacent to each end of the connecting rod. The cam has a rod insertion hole for allowing the end of the connecting rod to be inserted therein. The internal gear has a bush insertion hole for allowing the resin bush to be inserted therein at a center position of the internal gear. The fitting part adjacent to the end of the connecting rod fits in the fit hole of the resin bush, and the end of the connecting rod protrudes outward of the resin bush. The resin bush is placed in the bush insertion hole in contact with an inner surface of the bush insertion hole of the internal gear to retain the connecting rod at such a position to the cam that a clearance exists between an inner surface of the rod insertion hole of the cam and an outer surface of the connecting rod. The inner surface of the bush insertion hole has an edge of the bush insertion hole.

According this configuration, the resin bush is placed in the bush insertion hole in contact with the inner surface of the bush insertion hole of the internal gear to retain the connecting rod at such a position to the cam that the clearance exists between the inner surface of the rod insertion hole of the cam and the outer surface of the connecting rod. In this manner, the resin bush restricts the shift of the connecting rod relative to the cam in the radial direction of the cam, and thus can prevent an occurrence of a contact sound between the cam and the connecting rod. This results in achieving effective prevention of abnormal sound while permitting the clearance to exist between the inner surface of the rod insertion hole of the cam and the outer surface of the connecting rod.

In the reclining device, the fit hole of the resin bush preferably has a shape conforming to a contour of the fitting part of the connecting rod.

According to this configuration, a work of attaching the resin bush to the connecting rod is completed only by fitting the fitting part adjacent to the end of the connecting rod in the fit hole of the resin bush. Thus, the work has good workability. Furthermore, a simple configuration of the connecting rod and the resin bush in combination succeeds in preventing the resin bush from axially coming off the internal gear and further preventing the resin bush from falling off the connecting rod.

In the reclining device, the resin bush preferably has a flange coming into contact with the frame of the one of the seat cushion and the seatback that is fixedly attached to the internal gear in an axial direction of the connecting rod.

According to this configuration, the flange of the resin bush can restrict the shift of the resin bush in the axial direction of the connecting rod by coming into contact with the frame of the one of the seat cushion and the seatback in the axial direction.

In the reclining device, the resin bush preferably has a main body extending in the axial direction of the connecting rod and having a cylindrical shape to support the connecting rod in contact with an entire circumference of the connecting rod.

According to this configuration, the cylindrical main body of the resin bush supports the connecting rod in contact with the entire circumference of the connecting rod, and therefore can further restrict the shift of the connecting rod relative to the cam in the radial direction thereof. As a result, the effect of abnormal sound occurrence prevention is improved.

In the reclining device, the fitting part of the connecting rod preferably has a taper section narrowing as advancing to the end of the connecting rod, and the fit hole of the resin bush preferably has a taper hole section to fit to the taper section of the connecting rod.

According to this configuration, the taper section formed at the fitting part adjacent to the end of the connecting rod fits to the taper hole section of the fit hole of the resin bush to restrict the shift of the resin bush in the axial direction. Furthermore, a simple configuration of the connecting rod and the resin bush in combination succeeds in preventing the resin bush from axially coming off the internal gear and further preventing the resin bush from falling off the connecting rod without increasing the number of components.

In the reclining device, the resin bush preferably has a pair of claws extending in the axial direction of the connecting rod to support the connecting rod on both sides thereof.

According to this configuration, the claws of the resin bush support the connecting rod on both sides thereof, and therefore can further restrict the shift of the connecting rod relative to the cam in the radial direction. As a result, the effect of abnormal sound occurrence prevention is improved.

In the reclining device, preferably, the claws respectively have portions facing each other, and each having a shape fittable onto the fitting part of the connecting rod.

According to this configuration, each of the facing portions of the claws of the resin bush that face each other fit to the fitting part adjacent to the end of the connecting rod, and therefore can further restrict the shift of the connecting rod relative to the cam in the radial direction. As a result, the effect of abnormal sound occurrence prevention is improved.

In the reclining device, each of the claws preferably has an outer surface opposite to the connecting rod, and the outer surface preferably has a shape fittable in the bush insertion hole of the internal gear.

According to this configuration, the claws of the resin bush more effectively support the connecting rod on both sides thereof owing to the fitting of the pair of claws in the bush insertion hole of the internal gear. This enables further restriction of the shift of the connecting rod relative to the cam in the radial direction. In addition, the mere fitting of the pair of claws in the bush insertion hole facilitates determination on the positions of the resin bush and the connecting rod, resulting in improvement of the workability in the assembly of the reclining device.

In the reclining device, each of the claws preferably has an outer surface opposite to the connecting rod, and the outer surface preferably has a taper shape slanting to a center of the bush insertion hole as advancing to a leading end of the claw to come into contact with an edge of the bush insertion hole of the internal gear.

According to this configuration, the outer surface having the taper shape in each of the claws of the resin bush comes into contact with the edge of the bush insertion hole of the internal gear, thereby succeeding in reliably maintaining the contact state between the resin bush and the internal gear. Moreover, this configuration can accommodate a dimensional difference in one of the bush insertion hole of the claws, or both the insertion hole and the claws.

In the reclining device, the resin bush further preferably has an engagement part engageable with the frame of the one of the seat cushion and the seatback that is fixedly attached with the internal gear.

According to this configuration, the engagement part of the resin bush can prevent the resin bush from coming off the frame of one of the seat cushion and the seatback that is fixedly connected to the internal gear by engaging with the frame. Moreover, the resin bush is firmly fixed by both the frame and the internal gear. The resin bush therefore can restrict the shift of the connecting rod relative to the cam in the radial direction of the cam. As a result, the effect of abnormal sound occurrence prevention is improved.

A seat according to the embodiment includes: a seat cushion: a seatback located in the rear of the seat cushion and being tiltable in a front-rear direction of the seat; and the reclining device to fixedly hold the seatback at a certain tilt angle.

The seat includes the reclining device having the configuration where the resin bush is placed in the bush insertion hole in contact with the inner surface of the bush insertion hole of the internal gear to retain the connecting rod in the state where the clearance exists between the inner surface of the rod insertion hole of the cam and the outer surface of the connecting rod. In this manner, the resin bush restricts the shift of the connecting rod relative to the cam in the radial direction of the cam. This results in achieving effective prevention of abnormal sound while permitting the clearance to exist between the inner surface of the rod insertion hole of the cam and the outer surface of the connecting rod.

Each of the reclining device and the seat according to the embodiment achieves effective prevention of abnormal sound while permitting the clearance to exist between the inner surface of the rod insertion hole of the cam and the outer surface of the connecting rod.

The invention claimed is:

1. A reclining device for holding a seatback to a seat cushion in a tiltable manner and fixing the seatback at a certain tilt angle, the reclining device comprising:
   a pair of reclining mechanisms arranged on both sides of a seat in a width direction thereof, and each having an internal gear fixedly attached to a frame of one of the seat cushion and the seatback and a cam arranged in juxtaposition with the internal gear in a thickness direction of the internal gear;
   a connecting rod extending in the width direction of the seat, coaxially coupled to the cam of each of the reclining mechanisms, and being rotatable together with the cam; and
   a resin bush having a cylindrical shape formed with a fit hole to receive a fitting part formed on the connecting rod at a portion adjacent to each end of the connecting rod, wherein
   the cam has a rod insertion hole for allowing the end of the connecting rod to be inserted therein,
   the internal gear has a bush insertion hole for allowing the resin bush to be inserted therein at a center position of the internal gear,
   the fitting part adjacent to the end of the connecting rod fits in the fit hole of the resin bush, and the end of the connecting rod protrudes outward of the resin bush, and
   the resin bush is placed in the bush insertion hole in contact with an inner surface of the bush insertion hole of the internal gear to retain the connecting rod at such a position to the cam that a clearance exists between an inner surface of the rod insertion hole of the cam and an outer surface of the connecting rod.

2. The reclining device according to claim 1, wherein the fit hole of the resin bush has a shape conforming to a contour of the fitting part of the connecting rod.

3. The reclining device according to claim 1, wherein the resin bush has a flange coming into contact with the frame of the one of the seat cushion and the seatback that is fixedly attached to the internal gear in an axial direction of the connecting rod.

4. The reclining device according to claim 1, wherein the resin bush has a main body extending in the axial direction of the connecting rod and having a cylindrical shape to support the connecting rod in contact with an entire circumference of the connecting rod.

5. The reclining device according to claim 1, wherein the fitting part of the connecting rod has a taper section narrowing as advancing to the end of the connecting rod, and
the fit hole of the resin bush has a taper hole section to fit to the taper section of the connecting rod.

6. The reclining device according to claim 1, wherein the resin bush has a pair of claws extending in the axial direction of the connecting rod to support the connecting rod on both sides thereof.

7. The reclining device according to claim 6, wherein the claws respectively have portions facing each other, and each having a shape fittable onto the fitting part of the connecting rod.

8. The reclining device according to claim 6, wherein each of the claws has an outer surface opposite to the connecting rod, and
the outer surface has a shape fittable in the bush insertion hole of the internal gear.

9. The reclining device according to claim 6, wherein each of the claws has an outer surface opposite to the connecting rod, and
the outer surface has a taper shape slanting to a center of the bush insertion hole as advancing to a leading end of the claw to come into contact with an edge of the bush insertion hole of the internal gear.

10. The reclining device according to claim 1, wherein the resin bush further has an engagement part engageable with the frame of the one of the seat cushion and the seatback that is fixedly attached to the internal gear.

11. A seat comprising:
a seat cushion:
a seatback located in the rear of the seat cushion and being tiltable in a front-rear direction of the seat; and
the reclining device according to claim 1 to fixedly hold the seatback at a certain tilt angle.

12. The reclining device according to claim 2, wherein the resin bush has a flange coming into contact with the frame of the one of the seat cushion and the seatback that is fixedly attached to the internal gear in an axial direction of the connecting rod.

13. The reclining device according to claim 2, wherein the resin bush has a main body extending in the axial direction of the connecting rod and having a cylindrical shape to support the connecting rod in contact with an entire circumference of the connecting rod.

14. The reclining device according to claim 3, wherein the resin bush has a main body extending in the axial direction of the connecting rod and having a cylindrical shape to support the connecting rod in contact with an entire circumference of the connecting rod.

15. The reclining device according to claim 2, wherein the fitting part of the connecting rod has a taper section narrowing as advancing to the end of the connecting rod, and
the fit hole of the resin bush has a taper hole section to fit to the taper section of the connecting rod.

16. The reclining device according to claim 3, wherein the fitting part of the connecting rod has a taper section narrowing as advancing to the end of the connecting rod, and
the fit hole of the resin bush has a taper hole section to fit to the taper section of the connecting rod.

17. The reclining device according to claim 4, wherein the fitting part of the connecting rod has a taper section narrowing as advancing to the end of the connecting rod, and
the fit hole of the resin bush has a taper hole section to fit to the taper section of the connecting rod.

18. The reclining device according to claim 2, wherein the resin bush has a pair of claws extending in the axial direction of the connecting rod to support the connecting rod on both sides thereof.

19. The reclining device according to claim 3, wherein the resin bush has a pair of claws extending in the axial direction of the connecting rod to support the connecting rod on both sides thereof.

20. The reclining device according to claim 4, wherein the resin bush has a pair of claws extending in the axial direction of the connecting rod to support the connecting rod on both sides thereof.

* * * * *